United States Patent [19]

Schnizler

[11] Patent Number: 5,332,163
[45] Date of Patent: Jul. 26, 1994

[54] MOTOR-DRIVEN MACHINE

[75] Inventor: Albrecht Schnizler, Nürtingen, Fed. Rep. of Germany

[73] Assignee: Metabowerke GmbH & Co., Nurtingen, Fed. Rep. of Germany

[21] Appl. No.: 9,730

[22] Filed: Jan. 27, 1993

[30] Foreign Application Priority Data

Jan. 28, 1992 [DE] Fed. Rep. of Germany ....... 4202195

[51] Int. Cl.$^5$ ............................ B25F 3/00; B26B 5/00; B02C 13/00
[52] U.S. Cl. ........................................ 241/56; 30/133; 241/185.6
[58] Field of Search ................... 30/133, 132, 41.5; 15/300.1, 355; 241/56, 293, 185.6

[56] References Cited

U.S. PATENT DOCUMENTS

| | | | |
|---|---|---|---|
| 3,096,718 | 7/1963 | Anderson | 241/185.6 |
| 3,866,643 | 2/1975 | Schaefer | 241/293 |
| 4,596,060 | 6/1986 | Schmidt et al. | 15/300.1 |
| 4,604,781 | 8/1986 | Rankin | 241/293 |
| 4,606,506 | 8/1986 | Okada et al. | 241/293 |
| 4,973,003 | 11/1990 | Chen | 241/56 |
| 5,031,364 | 7/1991 | Bechanger | 30/133 |
| 5,082,188 | 1/1992 | Urich | 241/56 |

FOREIGN PATENT DOCUMENTS

| | | |
|---|---|---|
| 735839 | 8/1955 | 955GBX . |
| 943970 | 6/1956 | Fed. Rep. of Germany . |
| 7411811 | 7/1974 | Fed. Rep. of Germany . |
| WO90/06832 | 6/1990 | Fed. Rep. of Germany . |
| 3811197C2 | 6/1990 | Fed. Rep. of Germany . |
| 4019331A1 | 10/1990 | Fed. Rep. of Germany . |

Primary Examiner—Eugenia Jones
Assistant Examiner—Paul M. Heyrana, Sr.
Attorney, Agent, or Firm—Jones, Tullar & Cooper

[57] ABSTRACT

A motor-driven machine with integrated suction duct removal of chips drawn or sucked into the machine, comprising: a drive motor; a suction removal fan including a fan wheel connected to and driven by the drive motor, the fan wheel having a plurality of blades; an air guide housing within which the blades rotate, the air guide housing having an inlet and an outlet, and defining a front wall; a suction conduit associated with the inlet of the air guide housing the suction conduit serving to conduct air and chips to the air guide housing; and a disintegrating element situated at the inlet of the air guide housing and in communication with the suction conduit, and extending between the front wall and the blades, the disintegrating element being fixed relative to the air guide housing. The blades of the fan wheel extend axially, face the front wall and define a gap with the disintegrating element. At least one cutting edge-like raised portion is formed on the disintegrating element in the gap, and sucked-in chips are disintegrated by means of the blades and the at least one cutting edge-like raised portion.

10 Claims, 2 Drawing Sheets

MOTOR-DRIVEN MACHINE

BACKGROUND OF THE INVENTION

The invention relates to a motor-driven machine, which is in the form of a hand tool, with integrated suction dust removal, and in particular a saw. The drive motor of the machine drives a fan wheel of a suction removal fan. The fan wheel is provided with blades and rotates in an air guide housing. The front wall of the guide housing is associated with the mouth of the suction conduit, and the outlet of the guide housing is in flow communication with a collecting container, wherein the sucked-in chips can be disintegrated by means of a chip cutting means which is formed by the blades of the fan wheel and at least one disintegrating element which co-operates therewith and which is fixed with respect to the housing.

Such a machine is known from DE-C-943 970. The known motor-driven machine is preferably a planning machine in which comparatively large planning chips or shavings but also dust, splinters and the like are produced. In order to prevent the immediate working area from becoming dirty, those chips and the like, immediately after they are produced, are engaged by the suction of the suction removal fan and transported by means thereof to a collecting container or the like. However, because it is not desirable to have the dimensions of the suction conduit and also the suction removal fan unnecessarily large, there is the risk of a blockage occurring, in particular when dealing with large chips and with a high level of chip production.

In order to avoid the risk of blockage, the previously known motor-driven machine has a chip cutting means which breaks up the chips and thereby overall improves chip transportation. In the machine of the prior art, the chip cutting means used is a breaking or disintegrating member which projects inclinedly into an internal frustoconical cavity in the fan wheel. When the large chips are thrown against the disintegrating member by the air flow, they break up and that results in the desired disintegrating effect. By virtue of its comparatively large spacing and its shape as well as because of the lack of a cutting edge, the chips are not cut up by the disintegrating member but only broken up into comparatively large pieces. That, however, is not sufficient to prevent blockage of the suction removal fan and/or the air guide duct.

It is also known from DE 38 43 236 A1 for an electric hand tool or an electric hand circular saw to be equipped with a suction dust removal device. In that arrangement, however, the chips are only sucked away and not reduced in size, so that here too there is the risk of a blockage occurring.

OBJECT AND SUMMARY OF THE INVENTION

An object of the invention is to develop a motor-driven machine of the kind described previously wherein the chips or the like which are sucked in are broken down in a particularly thorough fashion in order thereby to eliminate the risk of a blockage.

This object is achieved in accordance with the invention in that the motor-driven machine of the kind set forth in greater detail above is characterized in that the blades of the fan wheel of the machine are at a small spacing in the form of a gap, from the air guide housing, and at least one cutting edge-like raised portion which forms the disintegrating element projects into the gap between the edges of each blade. The blades face in the axial direction and the front wall of the air guide housing.

Particularly when a machine is in the form of a hand tool, that is to say it has to be held and possibly also moved when operating therewith, it is a matter of great advantage if the tool has an integrated suction dust removal arrangement and that arrangement does not noticeably increase the weight of the tool. What contributes in particular to that aspect is the feature that the chips can be particularly thoroughly broken down by means of at least one cutting edge-like raised portion and the blades of the fan wheel, by virtue of the fact that the blades are at only a gap-like spacing from the cutting edge-like raised portion or portions and the cutting edge-like raised portions of the air guide housing do not at least noticeably increase the weight of the hand tool. In the case of an electrically operated hand tool the collecting container is what is known as a dust bag or the like which is arranged directly beside or behind the hand tool and which is emptied from time to time.

The fact that the chips which are produced are constantly thoroughly cut up with the chip cutting means in accordance with the invention also prevents chips from becoming jammed between the fan blade and the housing.

Jammed chips which constantly rotate with the fan blade result in a relatively high level of frictional heat in the housing and grooving or channelling therein. Both phenomena are disadvantageous and therefore undesirable. By virtue of their sharp-edged configuration, in conjunction with the gap spacing, the cutting edge-like raised portions cause the chips to be immediately cut up in the course of possibly a few revolution of the fan wheel, into relatively small pieces which are then certain to be transported away by the fan. Because channelling or grooving is practically eliminated by virtue of the above-indicated phenomenon, the air guide housing can be made from comparatively soft material, in particular plastics material, for example polyamide or the like. Moreover that material is in many cases also used for the entire motor housing. The gap spacing is smaller than the usual thickness or size of the chips produced and the shape of the raised portion is so matched to the shape of the blade that all chips which are entrained by the latter can also be actually engaged, broken up and/or stripped off. On the other hand, however, there is no possibility of contact occurring between the fan blade and the cutting edge-like raised portions, at all operating temperatures.

In that respect it is particularly advantageous that the motor-driven machine can in a known manner also drive the suction removal fan at the same time so that there is no need for a separate drive for the latter.

A further development of the invention provides that the cutting edge-like raised portion or portions is or are disposed on an annular element which is disposed coaxially with respect to the fan wheel in the air guide housing and through which the sucked-in air can axially flow. It is precisely by virtue of using a separate element with the cutting edge-like raised portion or portions that it is possible to use a comparably soft material, in particular plastics material, for the air guide housing. That would not be possible with a cutting edge-like raised portion formed on the fan housing. Moreover, this design involves a fan which axially sucks in and radially ejects the air which is laden with dust and chips. In this case the edges of the blades, which face in the axial direction of the fan wheel, co-operate with the cutting edge-like raised portions.

In a particularly preferred embodiment of the invention the annular element forms the discharge flow end of a nozzle-like component which receives the flow at its narrower end. In that arrangement the annular element preferably does not extend exactly in a radial plane relative to the fan wheel axis, but rather its cross-section is slightly inclined relative to that radial plane and the associated end edges of the fan blades then extend approximately at the same angle relative to the notional radial plane. The transition to the narrower end of the nozzle is as usual arcuate in cross-section.

A further embodiment of the invention is arranged such that the discharge flow end of the air feed duct engages over the feed flow end of the nozzle-like component, wherein the two parts desirably bear sealingly against each other or a sealing element is interposed in order to prevent dust from escaping at that location.

Each cutting edge-like raised portion advantageously extends approximately in a tangential direction relative to the inward edge of the ring or relative to the narrower end of the nozzle-like component, wherein the inclined positioning is so selected that the chips and chip portions which have been separated off fly away outwardly. Moreover, the cutting edge-like raised portions desirably extend as far as the outside edge of the ring or the outside edge of the discharge flow end of the nozzle-like component. If the annular element or the nozzle-like component is made from metal, which in itself is the preferred material, then the cutting edge-like raised portion or portions can be formed by a stamped cut with a tongue-like region then being bent out by preferably almost the thickness of the material. When using other materials production is effected in a corresponding fashion using a method of production which is appropriate to the material.

BRIEF DESCRIPTION OF THE DRAWINGS

The invention is described in greater detail hereinafter with reference to the drawing which shows an embodiment of the invention and in which.

DETAILED DESCRIPTION OF A PREFERRED EMBODIMENT

Figure 2:
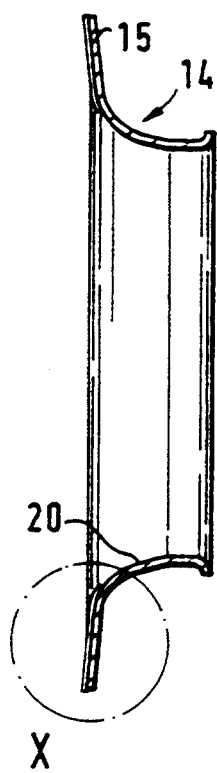
FIG. 2 is a view in radial section on a somewhat enlarged scale of the nozzle-like component in FIG. 1.
Figure 3:
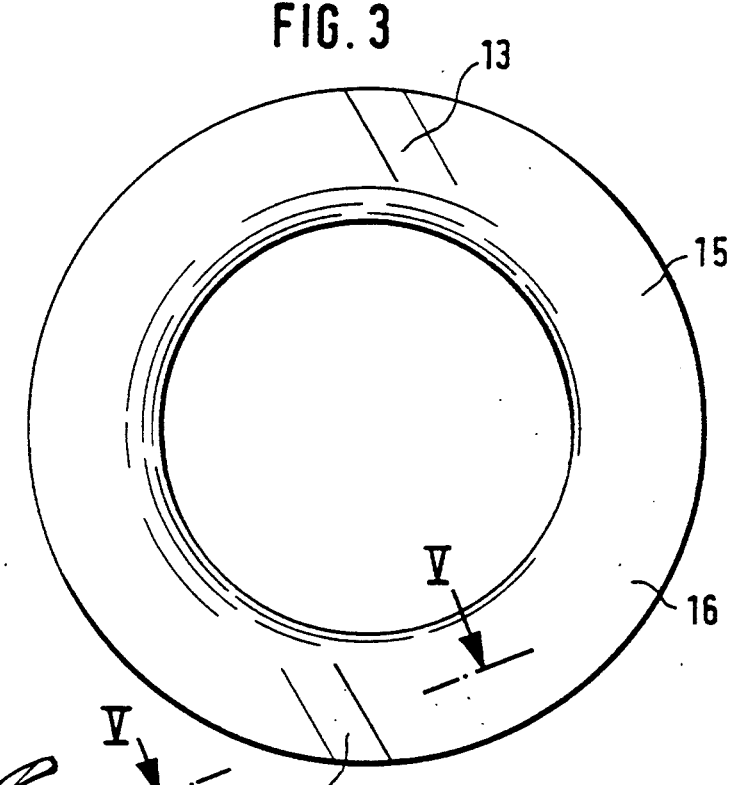
FIG. 3 is a view of the nozzle-like component shown in FIG. 2.

The motor-driven hand tool is, for example, an electric motor-driven compass saw. Part of an armature 1 of an electric motor 2 can be seen in FIG. 1. The right-hand armature bearing 3 is also shown. A fan wheel 5 of a fan 6 is fitted onto the projecting end 4 of the shaft of armature 1 to be non-rotatable relative thereto. The fan wheel 5 rotates in an air guide housing 7. The air guide housing 7 has a U-shape cross-section, in a known manner. The leg of the U-shape which is at the right in FIG. 1 forms a circular opening 9 by way of which the sucked-in air can flow in. The sucked-in air, and the dust, chips and the like contained therein, pass by way of a suction or feed conduit 10 in the direction indicated by the arrow 11 to the circular inlet opening of the fan 6. The fan wheel 5, which is equipped with conventional blades 12, transports the sucked-in contaminated air out of the air guide housing 7 in a radial direction to a discharge flow conduit (not shown) which leads to a dust bag or like collecting container. Disposed in the gap between the blades 12 and the leg 8 of the U-shape, which, so-to-speak, forms the front wall of the air guide housing 7, is at least one cutting edge-like raised portion 13 which projects towards the blades 12. In the illustrated embodiment however it is not disposed at the front wall of the air guide housing 7 but on a separate component which is shown in FIGS. 2 to 5. As shown in FIG. 2 the component 14 is of a nozzle-like configuration. As shown in FIG. 3, in the illustrated embodiment the component 14 is provided with two cutting edge-like raised portions 13 which are disposed at 180° on the periphery of the discharge flow end 15, which is of larger diameter, of the nozzle-like component 14. They each extend as far as the outer edge 16. As shown in FIG. 5, each has a sharp edge 17 which extends straight and which acts as a cutting edge.

Figure 1:
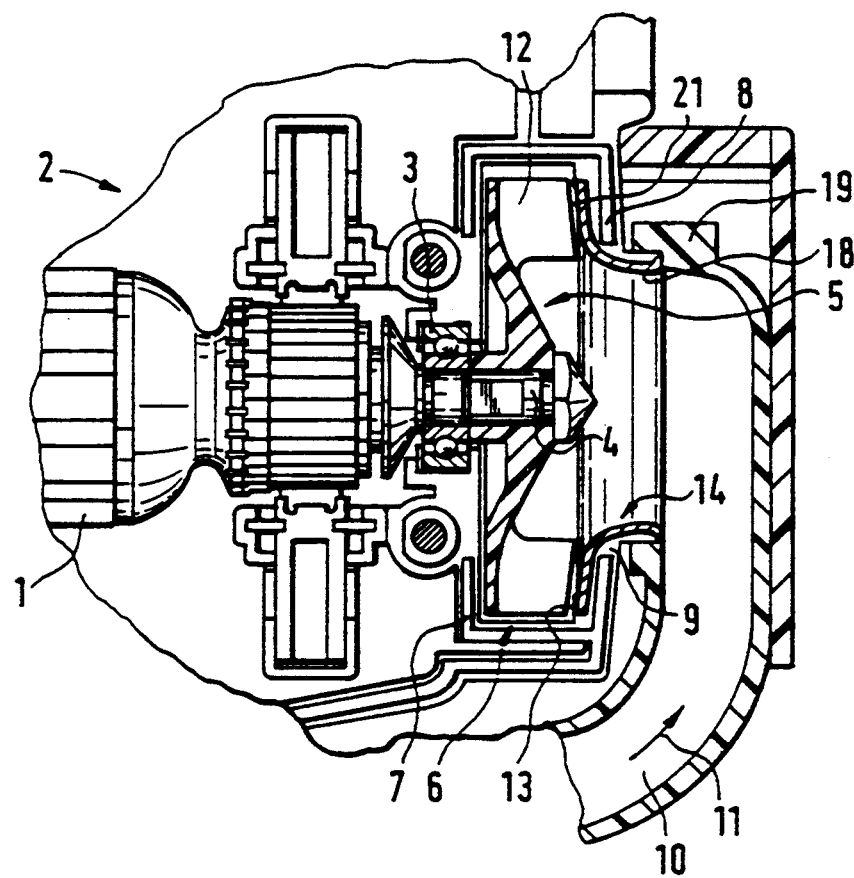
FIG. 1 is a partial section through a motor-driven hand tool.

As shown in FIG. 1, the narrower end 18 of the nozzle-like component 14 which faces away from the fan wheel 5 passes outwardly through the feed flow opening or the circular opening 9 of the air guide housing 7 or, more accurately, the front wall 8 of the air guide housing 7. Advantageously, the narrower end 18 engages and is received into a receiving means of suitable configuration at the discharge flow end 19 of the air feed conduit 10. The connection between the two elements should be as dust-tight as possible so as to prevent air and therewith also dust from escaping in that region.

Figure 4:
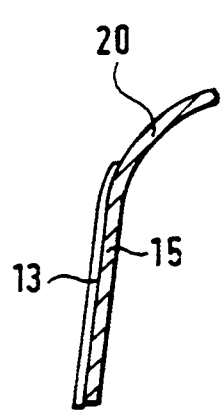
FIG. 4 shows the detail X in FIG. 2.
Figure 5:
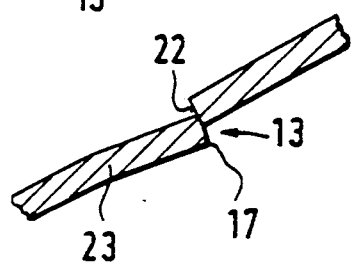
FIG. 5 is a view on an enlarged scale in section taken along line V—V in FIG. 3.

As shown in FIG. 4, each cutting edge-like raised portion 13, as stated, extends from the outer edge 16 of the nozzle-like component 14, which is formed as an annular element, to a position close to the inner edge of the annular element, or to approximately the arcuate transition 20 from the discharge flow end 15 to the narrower end 18. The cutting edge-like raised portion 13, and in particular the edge 17 thereof, extend substantially flat. For that reason the associated edge 21 of each blade 12 is also flat and it extends preferably parallel to the cutting edge 17 when it is disposed precisely opposite same. There is then only minimal gap between the two, which is sufficient to cut up or to detach a chip which is clinging on. It can also be seen from FIG. 3 that, when using an annular element, the cutting edge-like raised portions 13 extend substantially tangentially to the inside edge of the ring or, when using a nozzle-like component 14, they extend tangentially approximately in relation to the narrowest region of the component 14. More precisely that involves a tangent through a notional cylinder through the narrow location.

If the nozzle-like component 14 is made from metal, the cutting edge-like raised portion or portions can be produced by a procedure wherein two stamped cuts 22 are produced in the case of the illustrated embodiment, and then a respective tang 23 is pressed outwardly. The stamping cut automatically provides a sharp edge 17. The stamping cut can possibly be of an angular configuration, in a departure from FIG. 3, in order to make it easier to bend up the tang.

Besides the fan 6 for sucking away the dust and chips, the motor-driven hand tool may also have a further fan for motor cooling and such a fan is usually provided in an electrically operated hand tool. In that respect both the design configuration and also the arrangement of that cooling fan are known state of the art and therefore do not need to be described and illustrated in greater detail herein.

What is claimed is:

1. A motor-driven machine with integrated suction duct removal of chips drawn or sucked into the machine, comprising:

a drive motor;

a suction removal fan including a fan wheel connected to and driven by said drive motor, said fan wheel having a plurality of blades;

an air guide housing within which said plurality of blades rotate, said air guide housing having an inlet and an outlet, and defining a front wall;

a suction conduit associated with the inlet of said air guide housing, said suction conduit serving to conduct air and chips to said air guide housing; and a disintegrating element situated at the inlet of said air guide housing and in communication with said suction conduit, and extending between said front wall of said air guide housing and said plurality of blades, said disintegrating element being fixed relative to said air guide housing, wherein:

the disintegrating element comprises an annular element disposed coaxially with respect to said fan wheel and through which the sucked-in air and chips axially flow, said disintegrating element being formd as a nozzle-like component having a narrower end which receives the sucked-in air and chips from the suction conduit at its narrower end;

the plurality of blades of said fan wheel extend axially, face said front wall and define a gap with said disintegrating element;

at least one cutting edge-like raised portion is formed on said disintegrating element in said gap; and sucked-in chips are disintegrated in said gap by means of said plurality of blades and said at least one cutting edge-like raised portion.

2. The machine as defined in claim 1, wherein:

said suction conduit defines a discharge flow end and said air guide housing defines an axial feed flow opening; and the narrower end of the nozzle-like component passes outwardly through the axial feed flow opening and projects into the discharge flow end.

3. The machine as defined in claim 2, wherein:

the narrower end of the nozzle-like component is connected to the discharge flow end of said suction conduit.

4. The machine as defined in claim 1, wherein:

each cutting edge-like raised portion extends approximately in a tangential direction relative to an inward edge of said annular element.

5. The machine as defined in claim 1, wherein:

said annular element has an inward edge and an outward edge; and each cutting edge-like raised portion extends approximately in a tangential direction from the outward edge to close to the inward edge.

6. The machine as defined in claim 1, wherein:

each cutting edge-like raised portion is formed by a stamped cut, with a tongue-like region being bent out to substantially the thickness of the disintegrating element.

7. The machine as defined in claim 1, wherein:

the disintegrating element is made of a hard resistant material.

8. The machine as defined in claim 1, wherein:

the disintegrating element is made of steel.

9. The machine as defined in claim 1, wherein:

the disintegrating element is made of ceramic.

10. A motor-driven machine with integrated suction duct removal of chips drawn or sucked into the machine, comprising:

a drive motor;

a suction removal fan including a fan wheel connected to and driven by said drive motor, said fan wheel having a plurality of blades;

an air guide housing within which said plurality of blades rotate, said air guide housing having an inlet and an outlet, and defining a front wall;

a suction conduit associated with the inlet of said air guide housing, said suction conduit serving to conduct air and chips to said air guide housing; and a disintegrating element situated at the inlet of said air guide housing and in communication with said suction conduit, and extending between said front wall of said air guide housing and said plurality of blades, said disintegrating element being fixed relative to said air guide housing, wherein:

the disintegrating element comprises an annular element disposed coaxially with respect to said fan wheel and through which the sucked-in air and chips flow, said disintegrating element being formed as a nozzle-like component having a narrower end which receives the sucked-in air and chips from the suction conduit at its narrower end;

the plurality of blades of said fan wheel extend axially, face said front wall and define a gap with said disintegrating element;

at least one cutting edge-like raised portion is formed on said disintegrating element in said gap, each cutting edge-like raised portion extending approximately in a tangential direction relative to the narrower end; and sucked-in chips are disintegrated in said gap by means of said plurality of blades and said at least one cutting edge-like raised portion.

* * * * *